(12) United States Patent
Massarwa et al.

(10) Patent No.: US 12,496,138 B2
(45) Date of Patent: Dec. 16, 2025

(54) AUTOMATED TOOL FOR IDENTIFYING AND CORRECTING TENTING ARTIFACTS IN ANATOMICAL MAPPING

(71) Applicant: Biosense Webster (Israel) Ltd., Yokneam (IL)

(72) Inventors: Fady Massarwa, Baka al Gharbiyya (IL); Meytal Segev, Haifa (IL); Sigal Altman, Ramat Hashofet (IL); Akram Zoabi, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 156 days.

(21) Appl. No.: 18/428,648

(22) Filed: Jan. 31, 2024

(65) Prior Publication Data
US 2025/0241710 A1    Jul. 31, 2025

(51) Int. Cl.
*A61B 5/367* (2021.01)
*A61B 34/00* (2016.01)
*A61B 34/10* (2016.01)
*A61B 34/20* (2016.01)

(52) U.S. Cl.
CPC .............. *A61B 34/10* (2016.02); *A61B 34/20* (2016.02); *A61B 34/25* (2016.02); *A61B 2034/105* (2016.02)

(58) Field of Classification Search
CPC ................................ A61B 34/10; A61B 5/367
See application file for complete search history.

(56) References Cited

U.S. PATENT DOCUMENTS

| | | |
|---|---|---|
| 5,391,199 A | 2/1995 | Ben-Haim |
| 5,443,489 A | 8/1995 | Ben-Haim |
| 5,558,091 A | 9/1996 | Acker et al. |
| 6,172,499 B1 | 1/2001 | Ashe |
| 6,239,724 B1 | 5/2001 | Doron et al. |
| 6,332,089 B1 | 12/2001 | Acker et al. |
| 6,484,118 B1 | 11/2002 | Govari |
| 6,618,612 B1 | 9/2003 | Acker et al. |
| 6,690,963 B2 | 2/2004 | Ben-Haim et al. |
| 6,788,967 B2 | 9/2004 | Ben-Haim et al. |
| 6,892,091 B1 | 5/2005 | Ben-Haim et al. |

(Continued)

FOREIGN PATENT DOCUMENTS

| | | |
|---|---|---|
| EP | 2529667 B1 | 12/2016 |
| JP | 2019-188150 A | 10/2019 |

OTHER PUBLICATIONS

Extended European Search Report dated Mar. 11, 2025 for European Patent Application No. 24212661.3.

*Primary Examiner* — Rochelle D Turchen
(74) *Attorney, Agent, or Firm* — Volpe Koenig

(57) ABSTRACT

An electro-anatomical map is generated from first position information that defines an initial map surface. Second position information is acquired and used to determine an updated map surface. A difference between the initial and updated map surfaces corresponds to a change in the map. A first tenting analysis volume is determined based on at least part of the updated map surface. Third position information is acquired and used to define a second tenting analysis volume. The change in the map is identified as potentially corresponding to tenting in accordance with whether the first tenting analysis volume fails to overlap a predetermined amount with the second tenting analysis volume.

20 Claims, 13 Drawing Sheets

(56) References Cited

U.S. PATENT DOCUMENTS

| | | | |
|---|---|---|---|
| 7,536,218 B2 | 5/2009 | Govari et al. | |
| 7,756,576 B2 | 7/2010 | Levin | |
| 7,848,787 B2 | 12/2010 | Osadchy | |
| 7,869,865 B2 | 1/2011 | Govari et al. | |
| 8,456,182 B2 | 6/2013 | Bar-tal et al. | |
| 8,523,787 B2 | 9/2013 | Ludwin et al. | |
| 11,064,979 B2 | 7/2021 | Lieblich et al. | |
| 11,113,899 B1 | 9/2021 | Massarwa et al. | |
| 11,443,425 B2 | 9/2022 | Altman et al. | |
| 2012/0310116 A1* | 12/2012 | Ludwin | A61B 17/00234 600/587 |
| 2022/0095942 A1 | 3/2022 | Govari et al. | |

\* cited by examiner

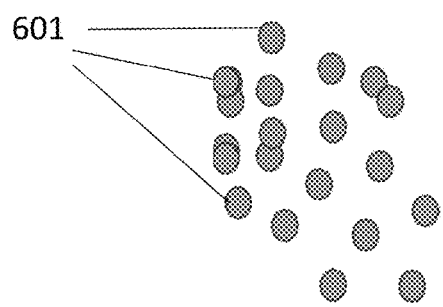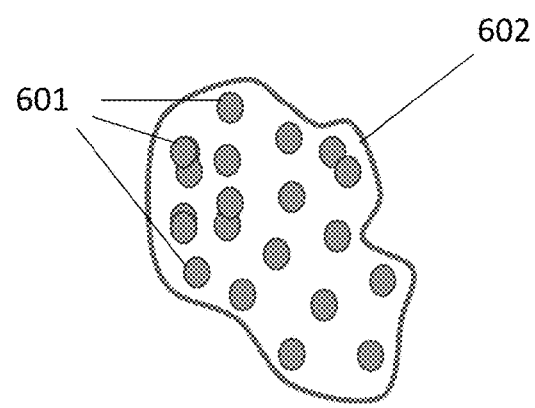
Fig. 6A
Fig. 6B

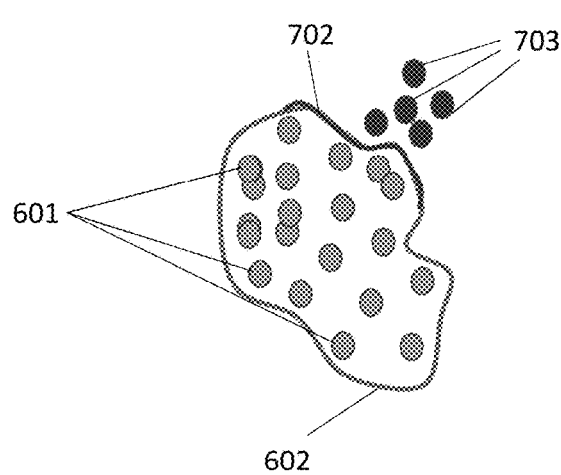 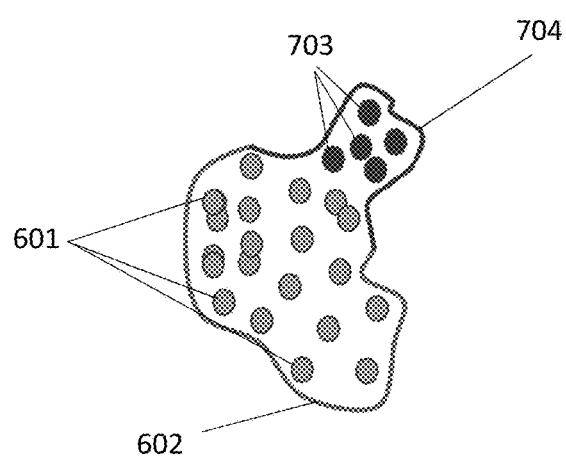
Fig. 7A
Fig. 7B

AUTOMATED TOOL FOR IDENTIFYING AND CORRECTING TENTING ARTIFACTS IN ANATOMICAL MAPPING

FIELD OF INVENTION

The present invention is related to anatomical mapping. More particularly, the present invention relates to the detection and correction of tenting artifacts in anatomical mapping.

BACKGROUND

Currently, catheter-based radio frequency (RF) ablation for pulmonary vein isolation is a first line of treatment for atrial fibrillation (AF). RF ablation requires a very accurate map.

For example, during an electrophysiology (EP) procedure, an anatomical map of a heart chamber is generated. Fast anatomical mapping (FAM) is one algorithm for building such an anatomical map from electrical signals captured by a catheter on a myocardium. The anatomical map is used to guide a physician to desired ablation sites.

During an EP procedure, errors in an electro-anatomical map are generated as a result of "tenting." Tenting occurs, for example, when the catheter impinges on a tissue wall resulting in the generation of a protrusion in the map. In such examples, the protrusion is not representative of the anatomical structure being mapped. Improvements are required to both detect and correct tenting errors during a procedure, so that a more accurate electro-anatomical map is presented to the physician.

SUMMARY

According to one or more embodiments, methods and systems for detecting and correcting an error in an electro-anatomical map are provided. The electro-anatomical map is generated using a catheter positioned in a human body, and the error is a result of tenting in the electro-anatomical map caused by impingement of the catheter against a tissue wall. First position information that defines an initial map surface of the electro-anatomical map is acquired as the catheter moves within the body. After acquisition of the first position information, second position information is acquired with the catheter and an updated map surface is determined based on the second position information. A difference between the initial map surface and the updated map surface corresponds to a change in the map. A first tenting analysis volume is determined based on at least part of the updated map surface. After acquisition of the second position information, third position information is acquired with the catheter, wherein the third position information is used to define a second tenting analysis volume relative to the second position information. The change in the map is identified as potentially corresponding to tenting in accordance with whether the first tenting analysis volume fails to overlap a predetermined amount with the second tenting analysis volume. A visual representation including the electro-anatomical map is presented to a user on a user interface, wherein the visual representation provides a visual indication that the change in the map potentially corresponds to tenting. The user interface is operable to delete the change in the map from the visual representation.

In some embodiments, the first tenting analysis volume corresponds to a spherical volume centered about a point on the updated map surface. In some examples, the change in the map is identified as potentially corresponding to tenting based on whether the third position information is within the spherical volume.

In some embodiments, an offset surface is determined by projecting a predetermined distance from the updated map surface, and the first tenting analysis volume corresponds to a volume between the updated map surface and the offset surface.

In some embodiments, the change in the map is identified as potentially corresponding to tenting based on whether previously acquired position information is within the first tenting analysis volume.

In some embodiments, the change in the map is identified as potentially corresponding to tenting based on whether a volume corresponding to the change in the map is smaller than a threshold.

In some embodiments, the predetermined amount of the overlap used for identifying tenting corresponds to a ratio between a size of the first tenting analysis volume and the second tenting analysis volume.

In some embodiments, the electro-anatomical map is a fast anatomical map that is generated during a cardiac ablation procedure.

According to one or more embodiments, the techniques for detecting and correcting tenting described herein can be implemented as methods, apparatuses, systems, and/or computer program products.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 6A depicts the collection of data points using a catheter according to one or more embodiments;

FIG. 6B depicts the determination of an initial map surface based on the data points shown in FIG. 6A;

FIG. 7A depicts the collection of further data points using a catheter according to one or more embodiments;

FIG. 7B depicts the determination of an updated map surface based on the data points shown in FIG. 7A;

DETAILED DESCRIPTION

Disclosed herein is a method and/or system for anatomical mapping. The method and/or system includes a processor executable code or software that is necessarily rooted in process operations by, and in processing hardware of, medical device equipment performing and using the anatomical mapping. For ease of explanation, the anatomical map is described herein with respect to mapping a heart. However, any anatomical structure, body part, organ, or portion thereof can be a target for mapping using the techniques described herein.

According to one or more embodiments, the methods and systems disclosed herein generate anatomical maps of the heart that include an endocardial surface of a left atrium (LA). A map can be one three-dimensional (3D) model or a combination of multiple 3D models. The methods and systems can generate and edit the maps of the heart and provide real-time or post-processed maps during or in connection with an EP procedure (e.g., an ablation procedure). By way of example, the methods and systems can detect tenting errors in an initial visualization (e.g., an output of a FAM), and provide an opportunity for a user to correct such errors, thereby improving the operations and outcomes of the anatomical mapping.

Figure 1:
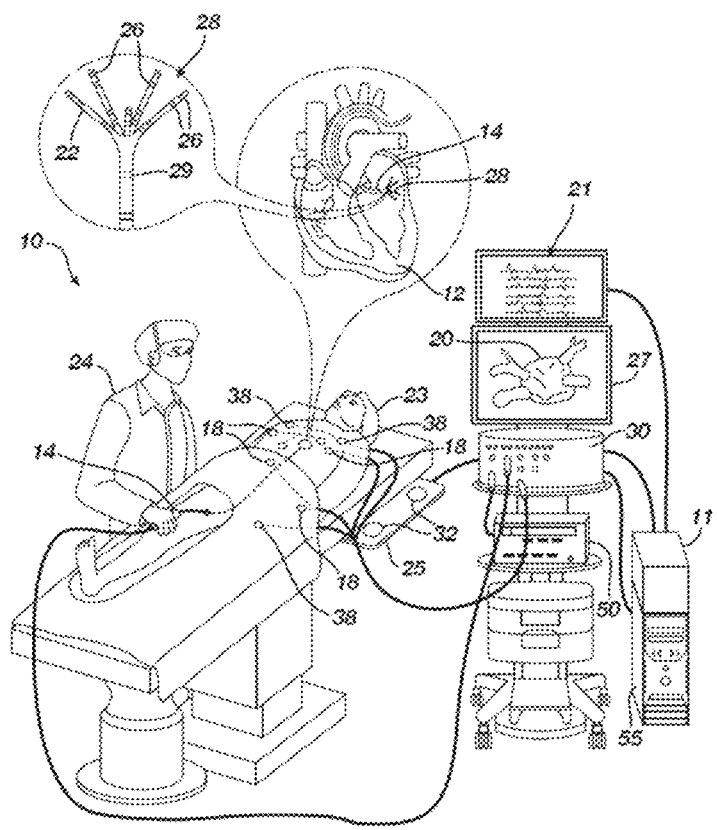
FIG. 1 depicts an example catheter-based electrophysiology mapping and ablation system according to one or more embodiments.

Reference is made to FIG. 1 showing an example system (e.g., medical device equipment and/or catheter-based electrophysiology mapping and ablation system), shown as system 10, in which one or more features of the subject matter herein can be implemented according to one or more embodiments. All or part of the system 100 can be used to collect information (e.g., biometric data) and/or used to implement the tenting detection and correction techniques as described herein. In some examples, the tenting error and correction techniques are implemented using a processor executable code or software that is stored on a memory of the system 10 and that is necessarily rooted in process operations by, and in processing hardware of, the system 10. As described herein, system 10 can generate maps (a.k.a. visualizations), detect tenting errors therein, and provide an operator with an opportunity to correct such errors during a medical procedure.

FIG. 1 illustrates a recorder 11, a heart 12, a catheter 14, a model or anatomical map 20, an electrogram 21, a spline 22, a patient 23, a physician 24 (which is representative of any medical professional, technician, clinician, operator, clinical support specialist, clinical account specialist, healthcare personnel, etc.), a location pad 25, one or more electrodes 26, a display device 27, a distal tip 28, a sensor 29, a coil 32, a patient interface unit (PIU) 30, electrode skin patches 38, an ablation energy generator 50, and a workstation 55. Note further each element and/or item of the system 10 is representative of one or more of that element and/or that item. The example system 10 shown in FIG. 1 implements the embodiments disclosed herein. The disclosed embodiments can similarly be applied using other system components and settings. Additionally, the system 10 can include additional components, for example elements for sensing electrical activity, wired or wireless connectors, processing and display devices, or other components.

The system 10 includes multiple catheters 14, which are percutaneously inserted by the physician 24 through the patient's vascular system into a chamber or vascular structure of the heart 12. Typically, a delivery sheath catheter is inserted into the left or right atrium near a desired location in the heart 12. Thereafter, a plurality of catheters can be inserted into the delivery sheath catheter to arrive at the desired location. The plurality of catheters 14 may include catheters dedicated for sensing Intracardiac Electrogram (IEGM) signals, catheters dedicated for ablating, and/or catheters dedicated for both sensing and ablating. The example catheter 14 that is configured for sensing IEGM is illustrated herein. The physician 24 brings the distal tip 28 of the catheter 14 into contact with a heart wall for sensing a target site in the heart 12. For ablation, the physician 24 would similarly bring a distal end of an ablation catheter to a target site for ablating.

The catheter 14 is an exemplary catheter that includes at least one and preferably multiple electrodes 26 optionally distributed over a plurality of splines 22 at the distal tip 28 and configured to sense the IEGM signals. The catheter 14 may additionally include the sensor 29 embedded in or near the distal tip 28 for tracking position and orientation of the distal tip 28. Optionally and preferably, the position sensor 29 is a magnetic based position sensor including three magnetic coils for sensing 3D position and orientation. According to one or more embodiments, shape and parameters of the catheter 14 vary based on whether the catheter 14 is used for diagnostic or ablation purposes, the type of arrhythmia, patient anatomy, and other factors, which affects catheter maneuverability (e.g., an ability to touch without bending the surface and the tracked parts of the catheter 14). The shape and parameters of the catheter 14 also impact the accuracy of anatomical maps. Large spherical single-shot catheters, which can ablate a pulmonary vein within seconds, have become popular but require guidance from fluoroscopy, CT/MRI, or additional mapping catheters. The tenting error detection and correction operations described herein resolve shortcomings of the catheter 14, by identifying and correcting mapping errors that can result from the catheter 14 impinging against a tissue wall during an EP procedure, as described herein.

The sensor 29 (e.g., a position or a magnetic based position sensor) may be operated together with the location pad 25 including a plurality of magnetic coils 32 configured to generate magnetic fields in a predefined working volume. Real time position of the distal tip 28 of the catheter 14 may be tracked based on magnetic fields generated with the location pad 25 and sensed by the sensor 29. Details of the magnetic based position sensing technology are described in U.S. Pat. Nos. 5,539,199; 5,443,489; 5,558,091; 6,172,499; 6,239,724; 6,332,089; 6,484,118; 6,618,612; 6,690,963; 6,788,967; 6,892,091.

The system 10 includes one or more electrode patches 38 positioned for skin contact on the patient 23 to establish location reference for the location pad 25 as well as impedance-based tracking of the electrodes 26. For impedance-based tracking, electrical current is directed toward the electrodes 26 and sensed at the patches 38 (e.g., electrode skin patches) so that the location of each electrode can be triangulated via the patches 38. Details of the impedance-based location tracking technology are described in U.S. Pat. Nos. 7,536,218; 7,756,576; 7,848,787; 7,869,865; and 8,456,182, which are incorporated herein by reference.

The recorder 11 displays the electrograms 21 captured with the electrodes 18 (e.g., body surface electrocardiogram (ECG) electrodes) and intracardiac electrograms (IEGM) captured with the electrodes 26 of the catheter 14. The recorder 11 may include pacing capability for pacing the heart rhythm and/or may be electrically connected to a standalone pacer.

The system 10 may include the ablation energy generator 50 that is adapted to conduct ablative energy to the one or more of electrodes 26 at the distal tip 28 of the catheter 14 configured for ablating. Energy produced by the ablation energy generator 50 may include, but is not limited to, radiofrequency (RF) energy or pulsed-field ablation (PFA) energy, including monopolar or bipolar high-voltage DC pulses as may be used to effect irreversible electroporation (IRE), or combinations thereof.

The PIU 30 is an interface configured to establish electrical communication between catheters, electrophysiological equipment, power supply and the workstation 55 for controlling operation of the system 10. Electrophysiological equipment of the system 10 may include for example, multiple catheters 14, the location pad 25, the body surface ECG electrodes 18, the electrode patches 38, the ablation energy generator 50, and the recorder 11. Optionally and preferably, the PIU 30 additionally includes processing capability for implementing real-time computations of location of the catheters and for performing ECG calculations.

The workstation 55 includes memory, a processor unit with memory or storage with appropriate operating software loaded therein, and user interface capability. The workstation 55 may provide multiple functions, optionally including modeling the endocardial anatomy in three-dimensions (3D) and rendering the model or anatomical map 20 (e.g., a visualization) for display on the display device 27, displaying on the display device 27 activation sequences (or other data) compiled from recorded electrograms 21 in representative visual indicia or imagery superimposed on the rendered anatomical map 20, displaying real-time location and orientation of multiple catheters within the heart chamber, and displaying on the display device 27 sites of interest for example places where ablation energy has been applied. One commercial product embodying elements of the system 10 is available as the CARTO™ 3 System, available from Biosense Webster, Inc., 31A Technology Drive, Irvine, CA 92618. Note that modeling the endocardial anatomy in 3D can include generating a surface thereof as a triangular mesh.

For instance, the system 10 can be part of a surgical system (e.g., CARTO® system sold by Biosense Webster) that is configured to obtain biometric data (e.g., anatomical and electrical measurements of a patient's organ, for example the heart 12 and as described herein) and perform a cardiac ablation procedure. More particularly, treatments for cardiac conditions for example cardiac arrhythmia often require obtaining a detailed mapping of cardiac tissue, chambers, veins, arteries and/or electrical pathways. For example, a prerequisite for performing a catheter ablation successfully is that the cause of the cardiac arrhythmia is accurately located in a chamber of the heart 12. Such locating may be done via an electrophysiological investigation during which electrical potentials are detected and spatially resolved with a mapping catheter (e.g., the catheter 14) introduced into the chamber of the heart 12. This electrophysiological investigation, the so-called electro-anatomical mapping, thus provides 3D mapping data which can be displayed on the display device 27. In many cases, the mapping function and a treatment function (e.g., ablation) are provided by a single catheter or group of catheters such that the mapping catheter also operates as a treatment catheter at the same time.

Figure 2:
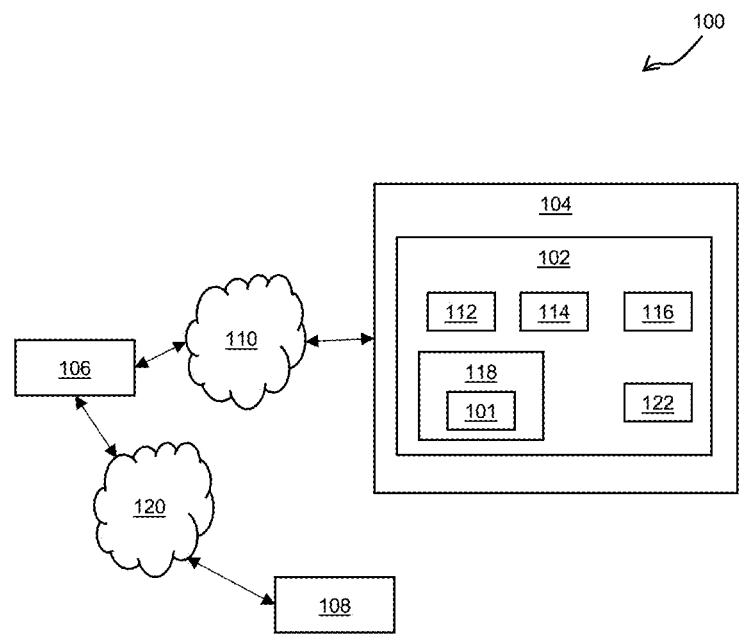
FIG. 2 is a block diagram of an example system for remotely monitoring and communicating biometric data according to one or more embodiments.

FIG. 2 is a block diagram of an example system 100 for remotely monitoring and communicating biometric data (e.g., patient biometrics). In the example illustrated in FIG. 2, the system 100 includes a patient biometric monitoring and processing apparatus 102 associated with a patient 104, a local computing device 106, a remote computing system 108, a first network 110, a patient biometric sensor 112, a processor 114, a user input (UI) sensor 116, a memory 118, a second network 120, and a transmitter-receiver (i.e., transceiver) 122.

According to one or more embodiments, the patient biometric monitoring and processing apparatus 102 may be an apparatus that is internal to the patient's body (e.g., subcutaneously implantable), for example the catheter 14 of FIG. 1. The patient biometric monitoring and processing apparatus 102 may be inserted into a patient via any applicable manner including orally injecting, surgical insertion via a vein or artery, an endoscopic procedure, or a laparoscopic procedure.

According to one or more embodiments, the patient biometric monitoring and processing apparatus 102 may be an apparatus that is external to the patient, for example the electrode patches 38 of FIG. 1. For example, as described in more detail below, the patient biometric monitoring and processing apparatus 102 may include an attachable patch (e.g., that attaches to a patient's skin). The monitoring and processing apparatus 102 may also include a catheter with one or more electrodes, a probe, a blood pressure cuff, a weight scale, a bracelet or smart watch biometric tracker, a glucose monitor, a continuous positive airway pressure (CPAP) machine or virtually any device which may provide an input concerning the health or biometrics of the patient.

According to one or more embodiments, the patient biometric monitoring and processing apparatus 102 may include both components that are internal to the patient and components that are external to the patient.

A single patient biometric monitoring and processing apparatus 102 is shown in FIG. 2. Example systems may, however, include a plurality of patient biometric monitoring and processing apparatuses. A patient biometric monitoring and processing apparatus may be in communication with one or more other patient biometric monitoring and processing apparatuses. Additionally or alternatively, a patient biometric monitoring and processing apparatus may be in communication with the network 110.

One or more patient biometric monitoring and processing apparatuses 102 may acquire biometric data (e.g., patient biometrics, for example electrical signals, blood pressure, temperature, blood glucose level, or other biometric data) and receive at least a portion of the biometric data representing the acquired patient biometrics and additional information associated with the acquired patient biometrics from one or more other patient biometric monitoring and processing apparatuses 102. The additional information may be, for example, diagnosis information and/or additional information obtained from an additional device, for example a wearable device. Each of the patient biometric monitoring and processing apparatus 102 may process data, including its own biometric data as well as data received from one or more other patient biometric monitoring and processing apparatuses 102.

Biometric data (e.g., patient biometrics, patient data, or patient biometric data) can include one or more of local activation times (LATs), electrical activity, topology, bipolar mapping, reference activity, ventricle activity, dominant frequency, impedance, or other data. The LAT can be a point in time of a threshold activity corresponding to a local activation, calculated based on a normalized initial starting point. Electrical activity can be any applicable electrical signals that can be measured based on one or more thresholds and can be sensed and/or augmented based on signal to noise ratios and/or other filters. A topology can correspond to the physical structure of a body part or a portion of a body part and can correspond to changes in the physical structure relative to different parts of the body part or relative to different body parts. A dominant frequency can be a frequency or a range of frequency that is prevalent at a portion of a body part and can be different in different portions of the same body part. For example, the dominant frequency of a PV of a heart can be different than the dominant frequency of the right atrium of the same heart. Impedance can be the resistance measurement at a given area of a body part.

Examples of biometric data include, but are not limited to, patient identification data, intracardiac electrocardiogram (IC ECG) data, bipolar intracardiac reference signals, anatomical and electrical measurements, trajectory information, body surface (BS) ECG data, historical data, brain biometrics, blood pressure data, ultrasound signals, radio signals, audio signals, two- or three-dimensional image data, blood glucose data, and temperature data. The biometrics data can be used, generally, to monitor, diagnosis, and treat any number of various diseases, for example cardiovascular diseases (e.g., arrhythmias, cardiomyopathy, and coronary artery disease) and autoimmune diseases (e.g., type I and type II diabetes). Note that BS ECG data can include data and signals collected from electrodes on a surface of a patient, IC ECG data can include data and signals collected from electrodes within the patient, and ablation data can include data and signals collected from tissue that has been ablated. Further, BS ECG data, IC ECG data, and ablation data, along with catheter electrode position data, can be derived from one or more procedure recordings.

In FIG. 2, the network 110 is an example of a short-range network (e.g., local area network (LAN), or personal area network (PAN)). Information may be sent, via the network 110, between the patient biometric monitoring and processing apparatus 102 and the local computing device 106 using any one of various short-range wireless communication protocols, for example Bluetooth, Wi-Fi, Zigbee, Z-Wave, near field communications (NFC), ultraband, or infrared (IR).

The network 120 may be a wired network, a wireless network or include one or more wired and wireless networks. For example, the network 120 may be a long-range network (e.g., wide area network (WAN), the internet, or a cellular network). Information may be sent, via the network 120 using any one of various long-range wireless communication protocols (e.g., TCP/IP, HTTP, 3G, 4G/LTE, or 5G/New Radio).

The patient biometric monitoring and processing apparatus 102 may include the patient biometric sensor 112, the processor 114, the UI sensor 116, the memory 118, and the transceiver 122. The patient biometric monitoring and processing apparatus 102 may continually or periodically monitor, store, process and communicate, via the network 110, any number of various biometric data. Examples of biometric data include electrical signals (e.g., ECG signals and brain biometrics), blood pressure data, blood glucose data, and temperature data. The biometric data may be monitored and communicated for treatment across any number of various diseases, for example cardiovascular diseases (e.g., arrhythmias, cardiomyopathy, and coronary artery disease) and autoimmune diseases (e.g., type I and type II diabetes).

The patient biometric sensor 112 may include, for example, one or more sensors configured to sense a type of biometric data. For example, the patient biometric sensor 112 may include an electrode configured to acquire electrical signals (e.g., heart signals, brain signals or other bioelectrical signals), a temperature sensor, a blood pressure sensor, a blood glucose sensor, a blood oxygen sensor, a pH sensor, an accelerometer and a microphone.

As described in more detail below, the patient biometric monitoring and processing apparatus 102 may be an ECG monitor for monitoring ECG signals of a heart (e.g., the heart 12). The patient biometric sensor 112 of the ECG monitor may include one or more electrodes for acquiring ECG signals. The ECG signals may be used for treatment of various cardiovascular diseases, as well as anatomical mapping.

The transceiver 122 may include a separate transmitter and receiver. Alternatively, the transceiver 122 may include a transmitter and receiver integrated into a single device.

The processor 114 may be configured to store biometric data in the memory 118 acquired by the patient biometric sensor 112 and to communicate the biometric data across the network 110 via a transmitter of the transceiver 122. Data from one or more other patient biometric monitoring and processing apparatus 102 may also be received by a receiver of the transceiver 122, as described in more detail herein. By way of example, the tenting error detection and correction techniques described herein are implemented as a processor executable code or software that can be stored on the memory 118 (as shown) and executed by the processor 114. By way of further example, the tenting error and correction techniques are implemented as code stored and executed on the local computing device 106 and/or the remote computing system 108. Thus, the operation of the tenting error and correction techniques is necessarily rooted in process operations by, and in processing hardware of, the system 100.

According to one or more embodiments, the system 100 operates to generate on a display (e.g., display device 27) an initial visualization (e.g., an electro-anatomical map) during an ablation procedure. The initial visualization is generated from data points sensed by a catheter positioned in a patent. Based on these data points, system 100 generates more or more initial map surfaces associated with such data points for display. During the procedure, further data points are acquired using catheter 14, including, for example, data points collected while the catheter impinges against a tissue wall. Using the further data points, an initial map surface is updated for display. The difference between the initial map surface and the updated map surface corresponds to a change in the map, and the techniques described herein (in connection with, e.g., FIGS. 5-12 below) analyze this change to determine whether it is the result of, or potentially the result of, a tenting error. By way of overview, in one example, in connection with this analysis, an offset surface is determined by adding an offset to at least a portion of the updated map surface. The offset surface defines at least part of a first tenting analysis volume. Additional data points are acquired (again using catheter 14), and used to define a second tenting analysis volume. According to embodiments of the analysis techniques disclosed herein, the change in the map is identified as potentially corresponding to tenting based on whether the first tenting analysis volume fails to overlap a predetermined amount with the second tenting analysis volume. In a case where tenting is detected as being present, a visual representation including the electro-anatomical map is presented to a user on a user interface, wherein the visual representation provides a visual indication that the change in the map potentially corresponds to tenting. The user interface is operable by the user to delete the change in the map from the visual representation. Alternatively, the data associated with the change in the map is deleted automatically.

In some embodiments of the tenting analysis techniques disclosed herein, a spherical volume centered about a point on the updated map surface is determined, and the change in the map is identified as potentially corresponding to tenting based on further position information (e.g., sensed data points) subsequently collected within the spherical volume. In some embodiments, the change in the map is identified as potentially corresponding to tenting based on whether previously acquired position information is within the first tenting analysis volume. In some embodiments, the change in the map is identified as potentially corresponding to tenting based on whether a volume corresponding to the change in the map is greater than a threshold.

According to one or more embodiments, the patient biometric monitoring and processing apparatus 102 includes UI sensor 116 that may be, for example, a piezoelectric sensor or a capacitive sensor configured to receive a user input, for example a tapping or touching. For example, the UI sensor 116 may be controlled to implement a capacitive coupling, in response to tapping or touching a surface of the patient biometric monitoring and processing apparatus 102 by the patient 104. Gesture recognition may be implemented via any one of various capacitive types, for example resistive capacitive, surface capacitive, projected capacitive, surface acoustic wave, piezoelectric and infra-red touching. Capacitive sensors may be disposed at a small area or over a length of the surface such that the tapping or touching of the surface activates the monitoring device.

As described in more detail below, the processor 114 may be configured to respond selectively to different tapping patterns of the capacitive sensor (e.g., a single tap or a double tap), which may be the UI sensor 116, such that different tasks of the patch (e.g., acquisition, storing, or transmission of data) may be activated based on the detected pattern. In some embodiments, audible feedback may be given to the user from the patient biometric monitoring and processing apparatus 102 when a gesture is detected.

The local computing device 106 of the system 100 is in communication with the patient biometric monitoring and processing apparatus 102 and may be configured to act as a gateway to the remote computing system 108 through the second network 120. The local computing device 106 may be, for example, a, smart phone, smartwatch, tablet or other portable smart device configured to communicate with other devices via the network 120. Alternatively, the local computing device 106 may be a stationary or standalone device, for example a stationary base station including, for example, modem and/or router capability, a desktop or laptop computer using an executable program to communicate information between the patient biometric monitoring and processing apparatus 102 and the remote computing system 108 via the PC's radio module, or a USB dongle. Biometric data may be communicated between the local computing device 106 and the patient biometric monitoring and processing apparatus 102 using a short-range wireless technology standard (e.g., Bluetooth, Wi-Fi, ZigBee, Z-wave and other short-range wireless standards) via the short-range wireless network 110, for example a local area network (LAN) (e.g., a personal area network (PAN)). In some embodiments, the local computing device 106 may also be configured to display the acquired patient electrical signals and information associated with the acquired patient electrical signals, as described in more detail herein.

In some embodiments, the remote computing system 108 may be configured to receive at least one of the monitored patient biometrics and information associated with the monitored patient via network 120, which is a long-range network. For example, if the local computing device 106 is a mobile phone, network 120 may be a wireless cellular network, and information may be communicated between the local computing device 106 and the remote computing system 108 via a wireless technology standard, for example any of the wireless technologies mentioned above. As described in more detail below, the remote computing system 108 may be configured to provide (e.g., visually display and/or aurally provide) the at least one of the patient biometrics and the associated information to the physician 24.

Figure 3:
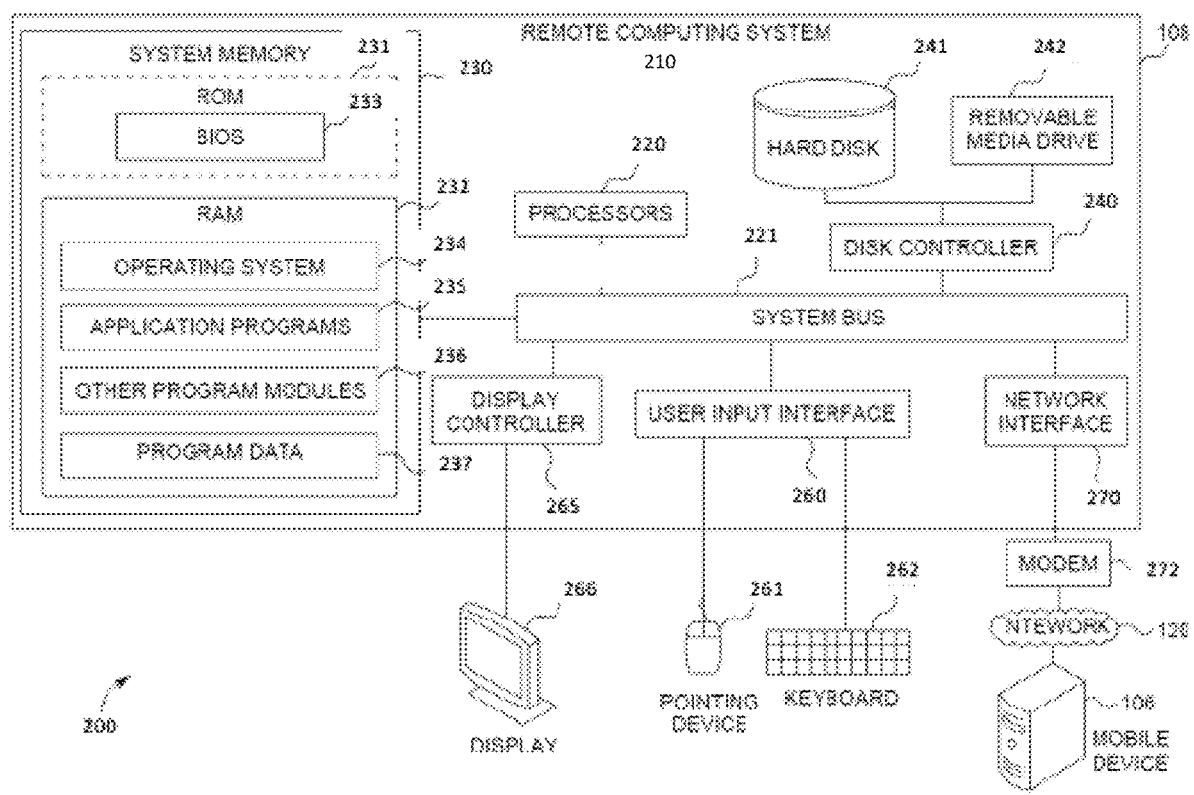
FIG. 3 is a system diagram of an example computing environment in communication with a network according to one or more embodiments.

FIG. 3 is a system diagram of an example of a computing environment 200 in communication with network 120. In some instances, the computing environment 200 is incorporated in a public cloud computing platform (e.g., Amazon Web Services or Microsoft Azure), a hybrid cloud computing platform (e.g., HP Enterprise OneSphere) or a private cloud computing platform.

As shown in FIG. 3, computing environment 200 includes a computer system 210, which is one example of the workstation 55 of FIG. 1, the local computing device 106 of FIG. 2, and/or the remote computing system 108 of FIG. 2 upon which embodiments described herein may be implemented. By way of example, the tenting detection and correction techniques described herein are implemented as a processor executable code or software that can be stored on the system memory 231 (as shown) and executed by processors 220, and rooted in process operations by, and in processing hardware of, the computing environment 200.

The computer system 210 may, via processors 220, which may include one or more processors, perform various functions. The functions may include analyzing monitored biometric data and the associated information and, according to physician-determined or algorithm driven thresholds and parameters, providing (e.g., via display 266) alerts, additional information or instructions. The functions may include the operation of the tenting error and correction techniques as described herein. As described in more detail herein, the computer system 210 may be used to provide (e.g., via display 266) the physician 24 of FIG. 1 with a dashboard of patient information, such that such information may enable the physician 24 to identify and prioritize patients having more critical needs than others.

As shown in FIG. 3, the computer system 210 may include a communication mechanism, for example a bus 221 or other communication mechanism for communicating information within the computer system 210. The computer system 210 further includes one or more processors 220 coupled with the bus 221 for processing the information. The processors 220 may include one or more CPUs, GPUs, or any other processor known in the art.

The computer system 210 also includes a system memory 230 coupled to the bus 221 for storing information and instructions to be executed by processors 220. The system memory 230 may include computer readable storage media in the form of volatile and/or nonvolatile memory, for example read only system memory (ROM) 231 and/or random-access memory (RAM) 232. The system memory RAM 232 may include other dynamic storage device(s) (e.g., dynamic RAM, static RAM, and synchronous DRAM). The system memory ROM 231 may include other static storage device(s) (e.g., programmable ROM, erasable PROM, and electrically erasable PROM). In addition, the system memory 230 may be used for storing temporary variables or other intermediate information during the execution of instructions by the processors 220. A basic input/output system 233 (BIOS) may contain routines to transfer information between elements within computer system 210, for example during start-up, that may be stored in system memory ROM 231. RAM 232 may comprise data and/or program modules that are immediately accessible to and/or presently being operated on by the processors 220. System memory 230 may additionally include, for example, operating system 234, application programs 235, other program modules 236 and program data 237.

The illustrated computer system 210 also includes a disk controller 240 coupled to the bus 221 to control one or more storage devices for storing information and instructions, for example a magnetic hard disk 241 and a removable media drive 242 (e.g., floppy disk drive, compact disc drive, tape drive, and/or solid-state drive). The storage devices may be added to the computer system 210 using an appropriate device interface (e.g., a small computer system interface (SCSI), integrated device electronics (IDE), Universal Serial Bus (USB), or FireWire).

The computer system 210 may also include a display controller 265 coupled to the bus 221 to control a monitor or display 266, for example a cathode ray tube (CRT) or liquid crystal display (LCD), for displaying information to a computer user. The illustrated computer system 210 includes a user input interface 260 and one or more input devices, for example a keyboard 262 and a pointing device 261, for interacting with a computer user and providing information to the processor 220. The pointing device 261, for example, may be a mouse, a trackball, or a pointing stick for communicating direction information and command selections to the processor 220 and for controlling cursor movement on the display 266. The display 266 may provide a touch screen interface that may allow input to supplement or replace the communication of direction information and command selections by the pointing device 261 and/or keyboard 262.

The computer system 210 may perform a portion or each of the functions and methods described herein in response to the processors 220 executing one or more sequences of one or more instructions contained in a memory, for example, the system memory 230. Such instructions may be read into the system memory 230 from another computer readable medium, for example, a hard disk 241 or a removable media drive 242. The hard disk 241 may contain one or more data stores and data files used by embodiments described herein. Data store contents and data files may be encrypted to improve security. The processors 220 may also be employed in a multi-processing arrangement to execute the one or more sequences of instructions contained in system memory 230. In alternative embodiments, hard-wired circuitry may be used in place of or in combination with software instructions. Thus, embodiments are not limited to any specific combination of hardware circuitry and software.

As stated above, the computer system 210 may include at least one computer readable medium or memory for holding instructions programmed according to embodiments described herein (e.g., embodiments of the tenting error detection and correction techniques) and for containing data structures, tables, records, or other data described herein. The term computer readable medium as used herein refers to any non-transitory, tangible medium that participates in providing instructions to the processor 220 for execution. A computer readable medium may take many forms including, but not limited to, non-volatile media, volatile media, and transmission media. Non-limiting examples of non-volatile media include optical disks, solid state drives, magnetic disks, and magneto-optical disks, for example hard disk 241 or removable media drive 242. Non-limiting examples of volatile media include dynamic memory, for example system memory 230. Non-limiting examples of transmission media include coaxial cables, copper wire, and fiber optics, including the wires that make up the bus 221. Transmission media may also take the form of acoustic or light waves, for example those generated during radio wave and infrared data communications.

The computing environment 200 may further include the computer system 210 operating in a networked environment using logical connections to local computing device 106 and one or more other devices, for example a personal computer (laptop or desktop), mobile devices (e.g., patient mobile devices), a server, a router, a network PC, a peer device or other common network node, and typically includes many or all of the elements described above relative to computer system 210. When used in a networking environment, computer system 210 may include modem 272 for establishing communications over a network 120, for example the Internet. Modem 272 may be connected to system bus 221 via network interface 270, or via another appropriate mechanism.

Network 120, as shown in FIGS. 2 and 3, may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 210 and other computers (e.g., local computing device 106).

Figure 4:
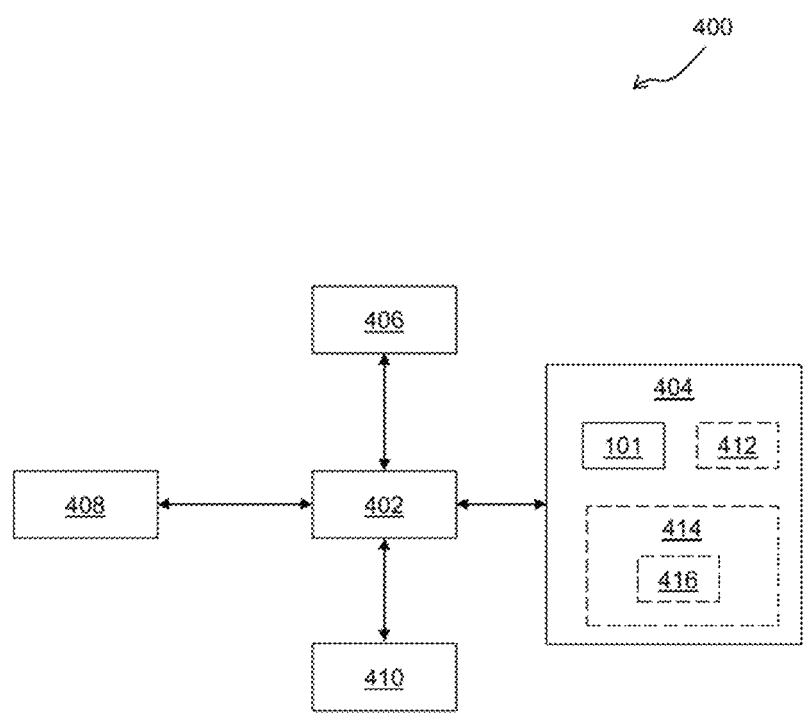
FIG. 4 is a system diagram of an example computing environment according to one or more embodiments.

FIG. 4 is a block diagram of an example device 400 in which one or more features of the disclosure can be implemented. The device 400 may be local computing device 106, for example. The device 400 can include, for example, a computer, a gaming device, a handheld device, a set-top box, a television, a mobile phone, or a tablet computer. The device 400 includes a processor 402, a memory 404, a storage device 406, one or more input devices 408, and one or more output devices 410. The device 400 can also optionally include an input driver 412 and an output driver 414. It is understood that the device 400 can include additional components not shown in FIG. 4 including an artificial intelligence accelerator.

In various alternatives, the processor 402 includes a central processing unit (CPU), a graphics processing unit (GPU), a CPU and GPU located on the same die, or one or more processor cores, wherein each processor core can be a CPU or a GPU. In various alternatives, the memory 404 is located on the same die as the processor 402, or is located separately from the processor 402. The memory 404 includes a volatile or non-volatile memory, for example, random access memory (RAM), dynamic RAM, or a cache. By way of example, the tenting error detection and correction techniques described herein are implemented as a processor executable code or software that can be stored on the memory 404 (as shown) and executed by processor 402, and rooted in process operations by, and in processing hardware of, the example device 400.

The storage device 406 includes a fixed or removable storage means, for example, a hard disk drive, a solid-state drive, an optical disk, or a flash drive. The input devices 408 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 410 include, without limitation, a display device, a speaker, a printer, a haptic feedback device, one or more lights, an antenna, or a network connection (e.g., a wireless local area network card for transmission and/or reception of wireless IEEE 802 signals).

The input driver 412 communicates with the processor 402 and the input devices 408, and permits the processor 402 to receive input from the input devices 408. The output driver 414 communicates with the processor 402 and the output devices 410, and permits the processor 402 to send output to the output devices 410. It is noted that the input driver 412 and the output driver 414 are optional components, and that the device 400 will operate in the same manner if the input driver 412 and the output driver 414 are not present. The output driver 414 includes an accelerated processing device ("APD") 416 which communicates to a display device as represented by the output devices 410. The APD 416 accepts compute commands and graphics rendering commands from processor 402, processes those compute and graphics rendering commands, and provides pixel output to display device for display. As described in further detail below, the APD 416 includes one or more parallel processing units to perform computations in accordance with a single-instruction-multiple-data ("SIMD") paradigm. Thus, although various functionality is described herein as being performed by or in conjunction with the APD 416, in various alternatives, the functionality described as being performed by the APD 416 is additionally or alternatively performed by other computing devices having similar capabilities that are not driven by a host processor (e.g., processor 402) and provides graphical output to a display device. For example, it is contemplated that any processing system that performs processing tasks in accordance with a SIMD paradigm may perform the functionality described herein. Alternatively, it is contemplated that computing systems that do not perform processing tasks in accordance with a SIMD paradigm perform the functionality described herein.

Figure 5A:
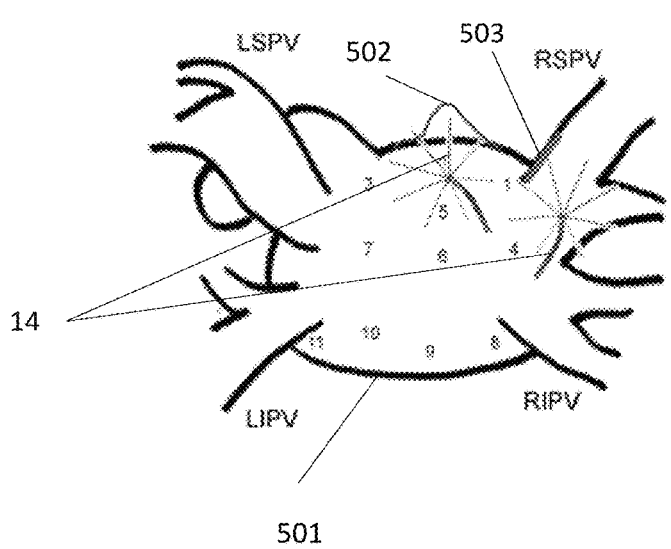
FIG. 5A is a posterior view illustrating an example of tenting according to one or more embodiments.
Figure 5B:
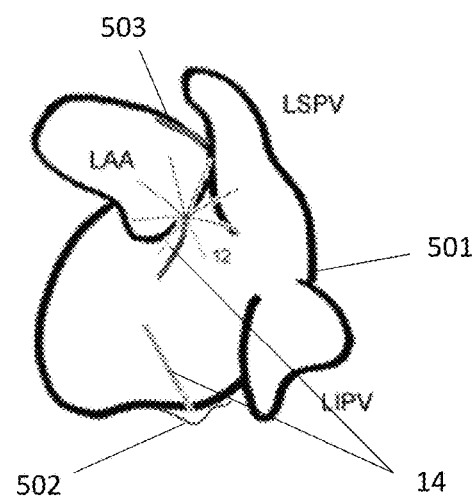
FIG. 5B is a lateral view of the example of FIG. 5A.

FIGS. 5A and 5B depict posterior and lateral views of an electro-anatomical map of a heart with a tenting error according to one or more embodiments. In both the posterior and lateral views, a surface 501 of the heart is depicted. In the example, surface 501 has been determined by system 10 based (solely or in part) on positional data points collected by catheter 14 during a cardiac procedure. As catheter 14 is moved by a physician during the procedure, catheter 14 can impinge upon a tissue wall causing tenting. More specifically, during this impingement, catheter 14 collects data points in the volume where the tissue wall has been deformed by catheter 14. Based on the collection of data points within the deformed volume, system 10 updates the surface 501 to include surface 502 as part of the map of the heart. Surface 502 corresponds to a tenting error, because it does not accurately reflect the heart surface, but rather represents a deformed version of the heart surface caused by the collection of data points during impingement of catheter 14 against the tissue wall. By contrast, when catheter 14 is moved parallel to a tissue wall (as illustrated by path 503), no similar impingement occurs. When catheter moves parallel to the tissue wall in this manner, positional data points collected using catheter 14 correspond to the actual volume of the heart, and thus can be used by system 10 to accurately update surface 501 based on additional positional data.

FIG. 6A depicts the collection of data points using a catheter 14 during a medical procedure, according to one or more embodiments. The data points 601 correspond to positions sensed by catheter 14 as it is moved through the heart during a procedure. As shown in FIG. 6B, based on the collected data points 601, system 100 determines an initial map surface 602 of a volume of a portion of the heart. Continuing with the same example, FIG. 7A depicts the collection of subsequent data points 703 from catheter 14 as the catheter is moved to a new position during the procedure. As a result of these further data points, the portion of the calculated surface 602 corresponding to portion 702 is recalculated (or updated) based on points 703. FIG. 7B depicts the determination of the updated map surface. The updated map surface includes the portion of previous surface 602 not corresponding to portion 702, together with surface portion 704.

Figure 8:
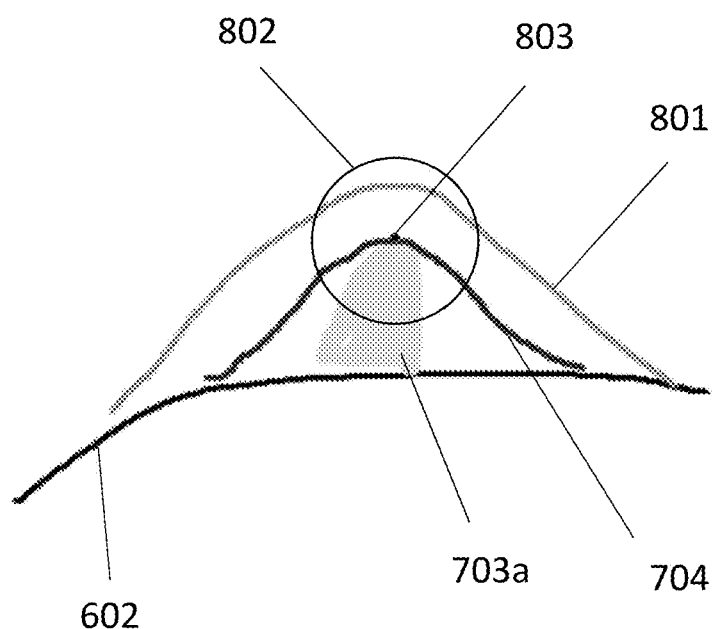
FIG. 8 depicts an initial map surface, an updated map surface, and an offset surface, according to one or more embodiments.

The difference between the map surface shown in FIG. 7A and the map surface shown in FIG. 7B corresponds to a change in the map resulting from the collection of additional data points 703. Next, as explained below, system 100 analyzes this change in the map to identify whether it corresponds to (or potentially corresponds to) a tenting error. Such an error would occur, for example, if catheter 14 had been impinging on a tissue wall at the time that data points 703 were collected by the catheter 14. The systems and method for detection of tenting disclosed herein apply one or more factors to analyze whether the change in the map is a result of a tenting error. Each of these factors is described below. It should be understood that each of these factors can be applied on its own to analyze whether the change in the map is a result of a tenting error. Alternatively, two, three or four factors can be considered in combination to perform the analysis. FIG. 8 (discussed below) depicts several parameters used for assessing one or more of these factors.

Turning now to FIG. 8, another view of the initial map surface 602 (from FIG. 6B) and the updated map surface 704 (from FIG. 7B) is shown. FAM volume 703a corresponds generally to the additional data points 703 (shown in FIGS. 7A and 7B) used for surface reconstruction. In one example of FIG. 8, FAM volume 703a corresponds to (or is defined relative to) the position data points collected by the catheter in the last X milliseconds (ms) of the procedure. In FIG. 8, surface 801 corresponds to an offset surface that tracks the shape of the updated map surface 704, but is offset from 704 by a predetermined distance. In some embodiments, surface 801 is determined by projecting a predetermined distance from the updated map surface 704 at an angle normal thereto. It will be understood by those skilled in the art that offset surface 801 is not limited to the embodiment shown, and that offset surface 801 can vary by way of shape and/or distance from updated map surface 704. As discussed below, offset surface 801 is applied in connection with the analysis of whether the change in the map (discussed above) corresponds to one or more of the factors associated with tenting.

Referring still to FIG. 8, volume 802 is also shown. In the embodiment shown, volume 802 corresponds to a sphere centered at the apex 803 of updated map surface 704. Volume 802 is also used in connection with the analysis of whether the change in the map (discussed above) corresponds to one or more of the factors associated with tenting. When volume 802 corresponds to a sphere, the sphere is not limited to the particular radius shown (e.g., the radius may be larger than that shown, even large enough to intersect with initial map surface 602) or limited to the midpoint shown (e.g., the midpoint may be positioned on other portions of updated map surface 704, or elsewhere in FIG. 8). In addition, volume 802 can take other shapes including, e.g., an ellipsoid Factor #1: Do First And Second Analysis Volumes (Sufficiently) Overlap?

Figures 9A, 9B:
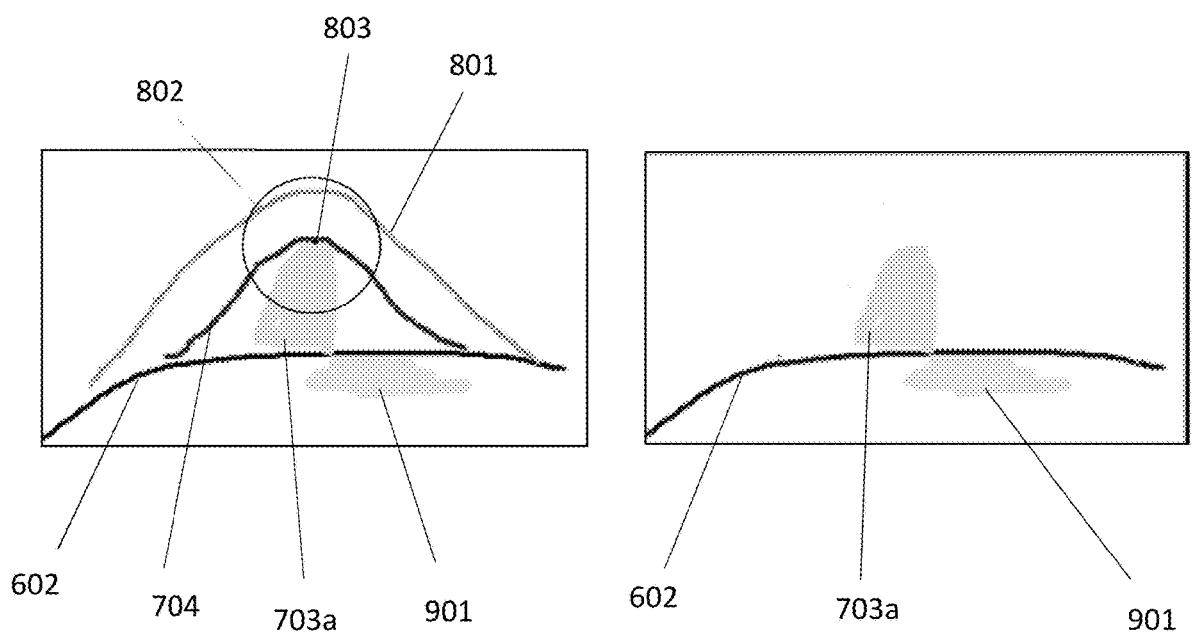
FIGS. 9A and 9B depict data point acquisitions that are identified as tenting, according to one or more embodiments.

Analysis Factor #1 considers overlap between two tenting analysis volumes, which will be described in connection with FIGS. 9A and 9B. Referring to FIG. 9A, for Factor #1, the first tenting analysis volume corresponds to volume 802 which, in the example shown, corresponds to a sphere centered at the apex 803 of updated map surface 704. As noted above, in some examples, FAM volume 703*a* corresponds to the position data points collected by the catheter in the last X ms. In one embodiment, further position data points are collected by the catheter in the next Y ms. A FAM volume associated with (or defined relative to) these further data points (illustrated by area 901 in FIGS. 9A and 9B) corresponds to a second tenting analysis volume. In various embodiments of Factor #1, overlap between the first and second tenting analysis volumes is analyzed to determine whether Factor #1 is satisfied. In some embodiments, Factor #1 simply considers whether there is any overlap at all between the first and second tenting analysis volumes. In other embodiments, the factor considers whether, if there are some overlap, whether the amount of overlap exceeds a threshold. Various parameters could be used to determine such a threshold, including basing the threshold on a ratio of the sizes of the first and second tenting analysis volumes, and/or the proximity of the further data point(s) to volume 802, center 803, updated map surface 704 and/or offset surface 801.

In cases such as that shown in FIGS. 9A and 9B, where there is no overlap between the first and second tenting analysis volumes, Factor #1 is indicative of the change in the map being attributable (or potentially attributable) to a tenting error. In other embodiments where any overlap is compared against a threshold, Factor #1 is indicative of the change in the map being attributable (or potentially attributable) to a tenting error when the threshold for overlap is not exceeded. In the example of FIG. 9A, there is no overlap between the first tenting analysis volume (defined, e.g., by volume 802) and the second tenting analysis volume (corresponding to the further data points acquired in the next Y ms illustrated by area 901), and the system 100 determines based on this lack of overlap that data points 703 are associated with tenting. As a result, as shown in FIG. 9B, updated map surface 704 is removed from the map, and the map surface 602 is restored to the shape it had prior to acquisition of data points 703. Further details about how the user interface of system 100 is operable to remove such tenting errors are discussed later, below.

Factor #2: Were There Subsequent Acquisitions in Offset Volume?

As noted above, in some examples, FAM volume 703*a* corresponds to the position data points collected by the catheter in the last X ms of a procedure, and further position data points are collected by the catheter in the next Y ms. Factor #2 considers whether any (or more than a threshold amount) of these further position data points fall within a volume between updated map surface 704 and the surface 801 (referred to as the "offset volume.") In some embodiments, surface 801 (offset surface) is determined by projecting a predetermined distance from the updated map surface 704 at an angle normal thereto. In some examples, the magnitude and/or area associated with the offset used to determine offset surface 801 is adjusted based on the type of catheter being used. For example, the offset is adjusted based on whether the catheter is a focal "push" design, or a fixed "push" design (such as the Optrell™ catheter.) In addition, the offset can be adjusted based on catheter mechanics like the shaft versus tip angle, as these mechanics can correlate with the force applied to the tissue wall when the catheter impinges against the tissue wall. In addition, in embodiments where information from a CT scan is integrated with the map information, the offset can be adjusted so that it does not overlap with structures previously identified in the CT scan.

In the example shown, a volume corresponding to further position data points collected by the catheter in the next Y ms is illustrated by area 1001 (in FIGS. 10A and 10B) and also corresponds to a second tenting analysis volume. In some embodiments, Factor #2 simply considers whether any data points in the second tenting analysis volume (corresponding to area 1001) are within the offset volume (between updated map surface 704 and the surface 801). In other embodiments, Factor #2 considers whether, if there are one or more of these further data points within the offset volume, whether the number and/or position of these further data points within the offset volume exceeds a threshold. Again, various parameters could be used to determine such a threshold, including, e.g., basing the threshold on a ratio of the sizes of the second tenting analysis volume and the offset volume, and/or the proximity of the further data point(s) in second tenting analysis volume to updated map surface 704 and/or offset surface 801.

Figures 10A, 10B:
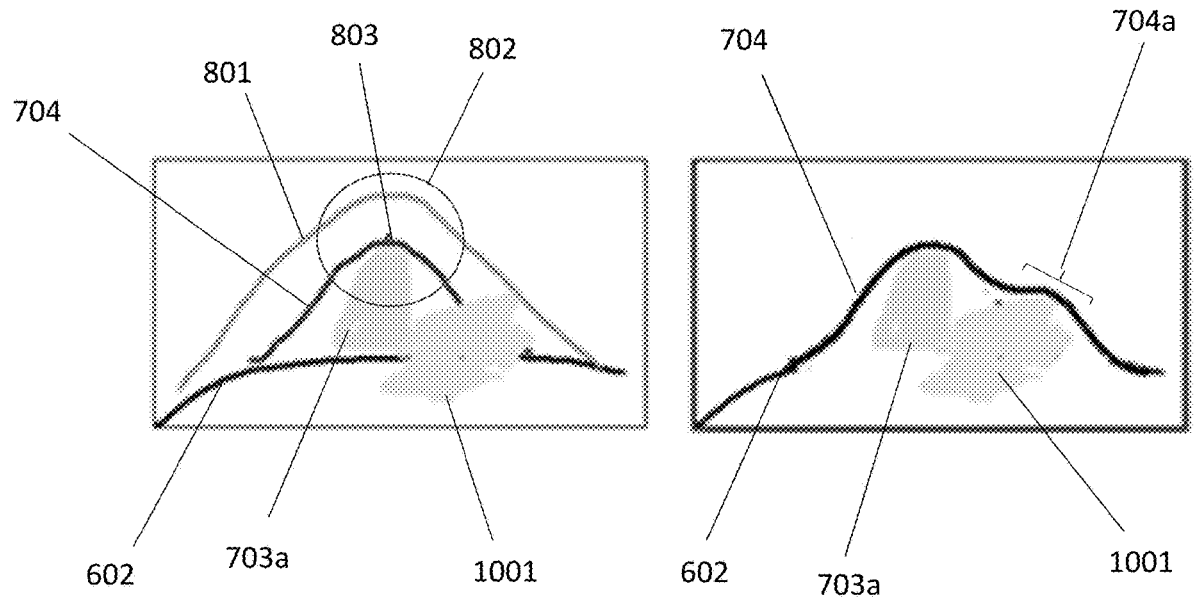
FIGS. 10A and 10B depict data point acquisitions that are not identified as tenting, according to one or more embodiments.

In cases such as that shown in FIG. 10A, where there is no overlap (or insufficient overlap) between volume 802 and the further data points (1001), Factor #2 is indicative of the change in the map being attributable (or potentially attributable) to a tenting error. However, in the example of FIGS. 10A and 10B, Factor #1 and Factor #2 are considered in combination in analyzing whether the change in the map is a result of (or potentially the result of) tenting. In connection the example of FIG. 10A, analysis of Factor #1 shows an overlap between tenting analysis volume 802 and the second tenting analysis volume (corresponding to the further data points illustrated by area 1001), indicating that the change in the map associated with data points 703 is not associated with tenting. In the example of FIGS. 10A and 10B, Factor #1 and Factor #2 are considered in combination, and the change in the map is determined to be a result of (or potentially the result of) tenting only if both factors are indicative of a tenting error. Since in FIG. 10A, Factor #1 is indicative of no tenting error while Factor #2 is indicative of a tenting error, system 100 determines that the data points 703 are not associated with tenting. As a result, the updated map surface 704 is not removed (as was the case in FIG. 9B). Instead, updated map surface 704 is used as the starting point to further update the map to reflect the further data points in the second tenting analysis volume (1001). This further update of surface 704 is reflected in surface portion 704*a*, which now accommodates the points associated with the second tenting analysis volume (1001).

It will be understood that, while in the example of FIGS. 10A and 10B, Factor #1 and Factor #2 are considered together in assessing whether the change in the map corresponds to a tenting error, the tenting error analysis could alternatively be based on Factor #2 by itself, or in combination with one or both of Factors #3 and #4, discussed below.

Factor #3: Were There Previous Acquisitions In The Area Of Change?

Figures 11A, 11B:
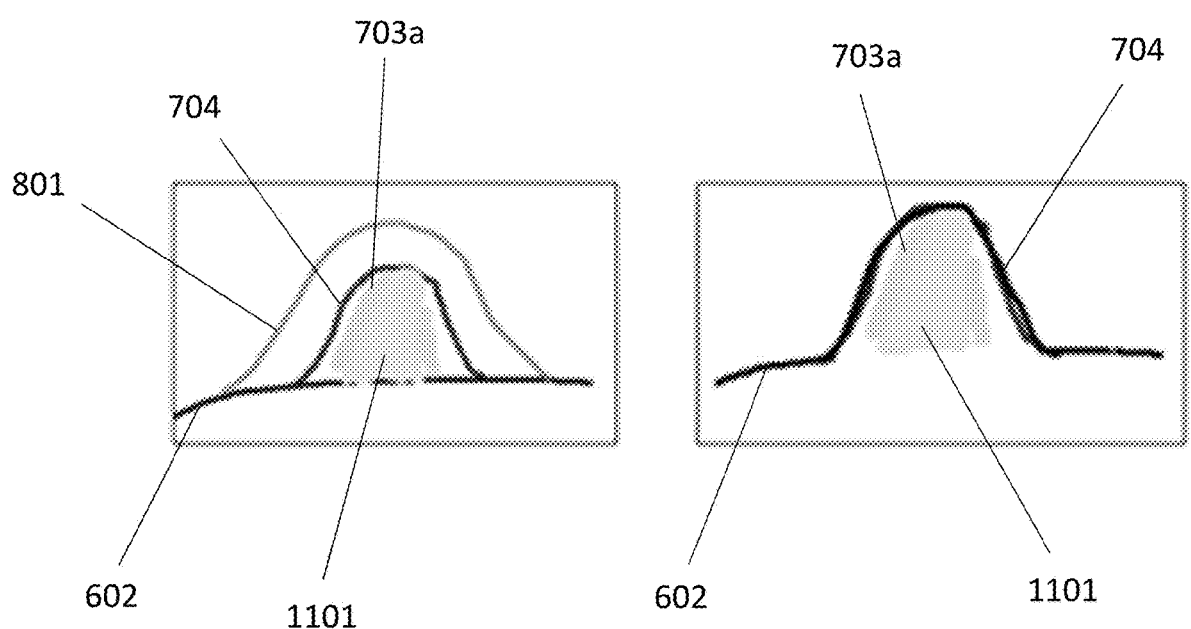
FIGS. 11A and 11B depict data point acquisitions that are not identified as tenting, according to one or more embodiments.

Factor #3 assesses whether the change in the map (associated with data points 703) corresponds to tenting, based on whether catheter 14 had previously acquired data points corresponding to FAM volume 703a. Application of Factor #3 is illustrated in FIGS. 11A and 11B. In this example, prior to the collection of data points 703 (defining FAM volume 703a), data points defining volume 1101 had previously been collected. In some embodiments, Factor #3 simply considers whether there is any overlap at all between FAM volumes 703a and 1101. In other embodiments, the factor considers whether, if there is some overlap, whether the amount of overlap exceeds a threshold. Various parameters could be used to determine such a threshold, including basing the threshold on a ratio of the sizes of the volumes 703a and 1101.

In cases such as that shown in FIGS. 11A and 11B, where there is overlap between volumes 703a and 1101, Factor #3 is indicative of the change in the map not being attributable to a tenting error. In other embodiments where an amount of such overlap is compared against a threshold, Factor #3 is indicative of the change in the map not being attributable to a tenting error when the threshold for overlap is not exceeded. In the example of FIG. 11A, since there is high overlap between FAM volume 703a and volume 1101, the system determines based on this overlap that data points 703 are not associated with tenting. As a result, the updated map surface 704 is not removed from the map (as was the case in FIG. 9B).

It will be understood that, while in the example of FIGS. 11A and 11B, Factor #3 is considered on its own in assessing whether the change in the map corresponds to a tenting error, the tenting error analysis could alternatively be based on Factor #3 in combination with one or more of the other factors discussed herein.

Factor #4: Total Acquired Volume<Threshold

In one example, Factor #4 considers whether the size of the total acquired volume (from the beginning of the mapping) is smaller than a predetermined threshold. If the total acquired volume is smaller than the threshold, Factor #4 tends to indicate that the change in the map is not the result of (or potentially the result of) tenting. In another example, Factor #4 considers whether the ratio of volume 703a and the total acquired volume (from the beginning of the mapping) is greater than a predetermined threshold. If this ratio is greater than the threshold, Factor #4 tends to indicate that that the change in the map is not the result of (or potentially the result of) tenting.

Use of Factor #4 is especially advantageous in the early stages of building an electro-anatomical map when relatively few positional data points (e.g., of the heart) have been collected. Factor #4 may be considered on its own in assessing whether the change in the map corresponds to a tenting error. Alternatively, the tenting error analysis is based on Factor #4 in combination with one or more of the other factors discussed herein.

Figure 12:
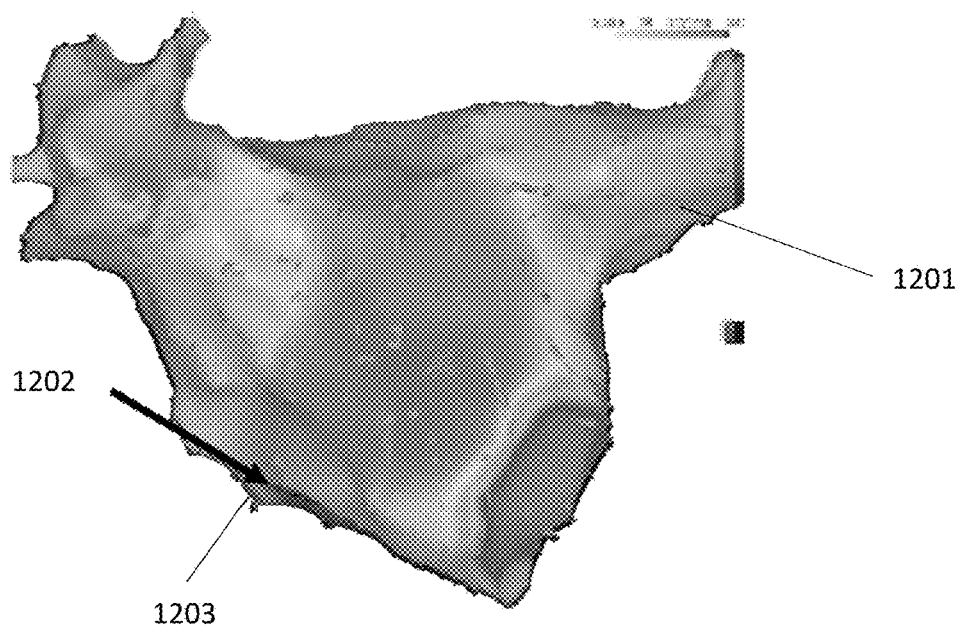
FIG. 12 depicts a user interface that identifies an area on an electro-anatomical map as potentially corresponding to tenting.

Referring now to FIG. 12, a user interface 1200 identifying an area 1203 on electro-anatomical map 1201 as potentially corresponding to a tenting error, is shown. In a case with the analysis described above (applying one or more of Factors #1-4) indicates that the change in the map (associated with, e.g., additional data points 703) is potentially a result of a tenting error, the area 1203 of the potential tenting error is flagged for an operator (using for example, the thick arrow 1202 shown). The user interface 1200 then provides the operator with an option to remove the updated map surface 704 associated with area 1203 from the map, and restore the previous map surface 602 associated with area 1203 to the shape it had prior to acquisition of data points 703.

Figure 13:
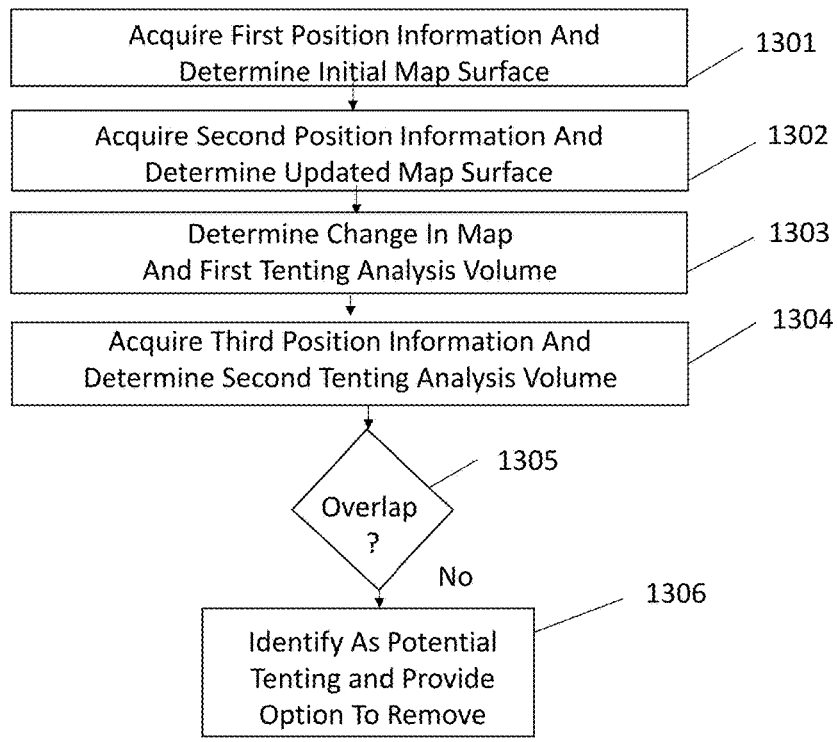
FIG. 13 depicts a method according to one or more embodiments.

Turning now to FIG. 13, a method 1300 is illustrated according to one or more exemplary embodiments. The method 1300 is an example set of operations rooted in and executed by the workstation 55 of FIG. 1, the local computing device 106 of FIG. 2, the remote computing system 108 of FIG. 2, and/or the example device 400 of FIG. 4. The method 1300 shows an example of how system 10 generates and presents maps of an anatomical structure (e.g., one or more 3D models) on a user interface, detects tenting errors, and provides (through the user interface) functionality that allows an operator to edit a map by removing a tenting error, for example during an EP procedure (e.g., an ablation procedure).

The method 1300 begins at block 1301, where first position information that defines an initial map surface of the electro-anatomical map is acquired as a catheter moves within the body. In one example, the first position information corresponds to data points 601 (FIG. 6A). The first position information is used to determine an initial map surface (such as, e.g., surface 602 (FIG. 6B)). The initial map surface is used to generate an electro-anatomical map corresponding to an initial visualization that is presented on a display as described herein.

The initial visualization is a map of an anatomical structure. For example, the initial visualization can be a 3D rendering of a heart chamber and include a rendering of the catheter within the heart chamber (in an actual position). The visualization can include various features including one or more tags (e.g., VISITAGS®), one or more catheters, one or more interior surfaces points (e.g., CARTO® points), one or more ultrasound controls, and/or one or more points.

At block 1302, second position information is acquired with the catheter. In one example, the second position information corresponds to data points 703 (FIG. 7A). The second position information is used to determine an updated map surface (such as, e.g., surface 704 (FIG. 7B)). The updated map surface is used to generate an electro-anatomical map corresponding to a further visualization that is presented on a display.

In block 1303, system 100 determines a difference between the initial map surface and the updated map surface, which corresponds to a change in the map resulting from the second position information. Also in block 1303, the system determines a first tenting analysis volume based on at least part of the updated map surface. In some embodiments, the first tenting analysis volume is a spherical volume centered about a point on the updated map surface. In some embodiments, an offset surface is determined by projecting a predetermined distance from the updated map surface, and the first tenting analysis volume corresponds to a volume between the updated map surface and the offset surface.

In block 1304, third position information representing additional data points (e.g., illustrated as 901 (FIG. 9A) or 1001 (FIG. 10A)) is acquired with the catheter. The third position information is used to define a second tenting analysis volume relative to the second position information.

In block 1305, the change in the map is identified as potentially corresponding to tenting in accordance with whether the first tenting analysis volume fails to overlap a predetermined amount with the second tenting analysis volume.

In block 1306, a visual representation including the electro-anatomical map is presented to a user on a user interface. The visual representation provides a visual indication (e.g., arrow 1202 in FIG. 12) that the change in the map potentially corresponds to tenting. In this step, the user interface is operable by the user to remove the change in map geometry from the visual representation.

In some embodiments, a spherical volume centered about a point on the updated map surface is determined, and the change in the map is identified as potentially corresponding to tenting based on whether the third position information is within the spherical volume.

In some embodiments, the change in the map is identified as potentially corresponding to tenting based on whether previously acquired position information is within the first tenting analysis volume.

In some embodiments, the change in the map is identified as potentially corresponding to tenting based on whether a volume corresponding to the change in the map is smaller than a threshold.

In some embodiments, the predetermined amount of the overlap used for identifying tenting corresponds to a ratio between a size of the first tenting analysis volume and the second tenting analysis volume.

In some embodiments, the electro-anatomical map is a fast anatomical map that is generated during a cardiac ablation procedure.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. A computer readable medium, as used herein, is not to be construed as being transitory signals per se, for example radio waves or other freely propagating electromagnetic waves, electromagnetic waves propagating through a waveguide or other transmission media (e.g., light pulses passing through a fiber-optic cable), or electrical signals transmitted through a wire Examples of computer-readable media include electrical signals (transmitted over wired or wireless connections) and computer-readable storage media. Examples of computer-readable storage media include, but are not limited to, a register, cache memory, semiconductor memory devices, magnetic media (e.g., internal hard disks and removable disks), magneto-optical media, optical media (e.g., compact disks (CD) and digital versatile disks (DVDs)), a random access memory (RAM), a read-only memory (ROM), an erasable programmable read-only memory (EPROM or Flash memory), a static random access memory (SRAM), and a memory stick. A processor in association with software may be used to implement a radio frequency transceiver for use in a terminal, base station, or any host computer.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting and correcting an error in an electro-anatomical map that is generated using a catheter positioned in a human body, wherein the error is a result of tenting in the electro-anatomical map caused by impingement of the catheter against a tissue wall, the method comprising:
    acquiring first position information that defines an initial map surface of the electro-anatomical map as the catheter moves within the body;
    after acquiring the first position information, acquiring second position information with the catheter and determining an updated map surface based on the second position information; wherein a difference between the initial map surface and the updated map surface corresponds to a change in the map;
    determining, based on at least part of the updated map surface, a first tenting analysis volume;
    after acquiring the second position information, acquiring third position information with the catheter, wherein the third position information is used to define a second tenting analysis volume relative to the second position information;
    identifying that the change in the map potentially corresponds to tenting in accordance with whether the first tenting analysis volume fails to overlap a predetermined amount with the second tenting analysis volume; and
    presenting a visual representation including the electro-anatomical map to a user on a user interface, wherein the visual representation provides a visual indication that the change in the map potentially corresponds to tenting;
    wherein the user interface is operable to delete the change in the map from the visual representation.

2. The method of claim 1, further comprising:
    wherein the first tenting analysis volume is a spherical volume centered about a point on the updated bounding surface;

wherein the identifying step further comprises identifying that the change in the map potentially corresponds to tenting in accordance with whether the third position information is within the spherical volume.

3. The method of claim 1, further comprising:
determining an offset surface by projecting a predetermined distance from the updated map surface; and
wherein the first tenting analysis volume is a volume between the updated map surface and the offset surface.

4. The method of claim 1, wherein the identifying step further comprises identifying that the change in the map potentially corresponds to tenting in accordance with whether previously acquired position information is within the first tenting analysis volume.

5. The method of claim 1, wherein the identifying step further comprises identifying that the change in the map potentially corresponds to tenting in accordance with whether a volume corresponding to the change in the map is smaller than a threshold.

6. The method of claim 1, wherein the predetermined amount of the overlap corresponds to a ratio between a size of the first tenting analysis volume and the second tenting analysis volume.

7. The method of claim 1, wherein the catheter is positioned in a human heart.

8. The method of claim 7, further comprising generating the electro-anatomical map during a cardiac ablation procedure.

9. A system for detecting and correcting an error in an electro-anatomical map that is generated using a catheter positioned in a human body, wherein the error is a result of tenting in the electro-anatomical map caused by impingement of the catheter against a tissue wall, the system comprising:
a memory that stores the electro-anatomical map;
a processor coupled to the memory; and
a user-interface coupled to the processor;
wherein the processor is configured to perform operations including:
acquiring first position information that defines an initial map surface of the electro-anatomical map as the catheter moves within the body;
after acquiring the first position information, acquiring second position information with the catheter and determining an updated map surface based on the second position information; wherein a difference between the initial map surface and the updated map surface corresponds to a change in the map;
determining, based on at least in part of the updated map surface, a first tenting analysis volume;
after acquiring the second position information, acquiring third position information with the catheter, wherein the third position information is used to define a second tenting analysis volume relative to the second position information;
identifying that the change in the map potentially corresponds to tenting in accordance with whether the first tenting analysis volume fails to overlap a predetermined amount with the second tenting analysis volume; and
presenting a visual representation including the electro-anatomical map to a user on the user interface, wherein the visual representation provides a visual indication that the change in the map potentially corresponds to tenting;
wherein the user interface is operable to delete the change in the map from the visual representation.

10. The system of claim 9, wherein the processor is further configured to:
determine the first tenting analysis volume as a spherical volume centered about a point on the updated map surface; and
identify that the change in the map potentially corresponds to tenting in accordance with whether the third position information is within the spherical volume.

11. The system of claim 9, wherein the processor is further configured to:
determine an offset surface by projecting a predetermined distance from the updated map surface; and
determine the first tenting analysis volume as a volume between the updated map surface and the offset surface.

12. The system of claim 9, wherein the processor is further configured to identify that the change in the map potentially corresponds to tenting in accordance with whether previously acquired position information is within the first tenting analysis volume.

13. The system of claim 9, wherein the processor is further configured to identify that the change in the map potentially corresponds to tenting in accordance with whether a volume corresponding to the change in the map is smaller than a threshold.

14. The system of claim 9, wherein the predetermined amount of the overlap corresponds to a ratio between a size of the first tenting analysis volume and the second tenting analysis volume.

15. The system of claim 9, wherein the catheter is positioned in a human heart.

16. The system of claim 15, wherein the processor is further configured to generate the electro-anatomical map during a cardiac ablation procedure.

17. A non-transitory computer-readable medium storing instructions that, when executed by a processor, cause the processor to perform operations comprising:
acquiring first position information that defines an initial map surface of the electro-anatomical map as the catheter moves within the body;
after acquiring the first position information, acquiring second position information with the catheter and determining an updated map surface based on the second position information; wherein a difference between the initial map surface and the updated map surface corresponds to a change in the map;
determining, based on at least part of the updated map surface, a first tenting analysis volume;
after acquiring the second position information, acquiring third position information with the catheter, wherein the third position information is used to define a second tenting analysis volume relative to the second position information;
identifying that the change in the map potentially corresponds to tenting in accordance with whether the first tenting analysis volume fails to overlap a predetermined amount with the second tenting analysis volume; and
presenting a visual representation including the electro-anatomical map to a user on the user interface, wherein the visual representation provides a visual indication that the change in the map potentially corresponds to tenting;
wherein the user interface is operable to delete the change in the map from the visual representation.

18. The non-transitory computer-readable medium of claim 17, wherein the instructions further cause the processor to:

determine the first tenting analysis volume as a spherical volume centered about a point on the updated map surface; and identify that the change in the map potentially corresponds to tenting in accordance with whether the third position information is within the spherical volume.

19. The non-transitory computer-readable medium of claim 17, wherein the instructions further cause the processor to identify that the change in the map potentially corresponds to tenting in accordance with whether previously acquired position information is within the first tenting analysis volume.

20. The non-transitory computer-readable medium of claim 17, wherein the instructions further cause the processor to identify that the change in the map potentially corresponds to tenting in accordance with whether a volume corresponding to the change in the map is smaller than a threshold.

* * * * *